(12) United States Patent
Cheng et al.

(10) Patent No.: US 8,052,825 B2
(45) Date of Patent: Nov. 8, 2011

(54) METHOD FOR MAKING COMPOSITE MATERIAL HAVING CARBON NANOTUBE ARRAY

(75) Inventors: Qun-Feng Cheng, Beijing (CN); Jia-Ping Wang, Beijing (CN); Kai-Li Jiang, Beijing (CN); Jia-Jia Wen, Beijing (CN); Shou-Shan Fan, Beijing (CN)

(73) Assignees: Tsinghua University, Beijing (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 357 days.

(21) Appl. No.: 12/510,438

(22) Filed: Jul. 28, 2009

(65) Prior Publication Data

US 2010/0065190 A1    Mar. 18, 2010

(30) Foreign Application Priority Data

Sep. 12, 2008   (CN) .......................... 2008 1 0216086

(51) Int. Cl.
*B29C 65/48*   (2006.01)
*B32B 37/00*   (2006.01)
*B32B 38/00*   (2006.01)
*B32B 43/00*   (2006.01)
*C23C 16/00*   (2006.01)

(52) U.S. Cl. .................. 156/250; 156/275.5; 156/275.7; 156/307.1; 156/307.7; 427/249.1; 427/307; 427/309

(58) Field of Classification Search .................. 156/152, 156/247, 250, 273.5, 275.5, 275.7, 285, 286, 156/293, 306.9, 307.1, 307.7; 427/249.1, 427/307, 309

See application file for complete search history.

(56) References Cited

U.S. PATENT DOCUMENTS

| | | | |
|---|---|---|---|
| 6,361,861 B2 * | 3/2002 | Gao et al. | 428/367 |
| 6,401,526 B1 * | 6/2002 | Dai et al. | 73/105 |
| 6,811,957 B1 * | 11/2004 | Mau et al. | 430/315 |
| 6,864,571 B2 * | 3/2005 | Arik et al. | 257/712 |
| 6,923,946 B2 * | 8/2005 | Geohegan et al. | 423/447.1 |
| 7,109,581 B2 * | 9/2006 | Dangelo et al. | 257/720 |
| 7,144,563 B2 * | 12/2006 | Rao et al. | 423/447.3 |
| 7,160,620 B2 * | 1/2007 | Huang et al. | 428/408 |
| 7,253,442 B2 * | 8/2007 | Huang et al. | 257/77 |
| 7,291,396 B2 * | 11/2007 | Huang et al. | 428/408 |
| 7,393,428 B2 * | 7/2008 | Huang et al. | 156/249 |
| 7,396,477 B2 * | 7/2008 | Hsiao | 216/2 |

(Continued)

FOREIGN PATENT DOCUMENTS

CN    1699452    11/2005

(Continued)

Primary Examiner — Sing P Chan
(74) Attorney, Agent, or Firm — Altis Law Group, Inc.

(57) ABSTRACT

A method for producing a composite material having a carbon nanotube array, includes the steps of: (a) providing the carbon nanotube array, the carbon nanotube array has a first end surface and a second end surface opposite to the first end surface; (b) providing a first board and a second board, fixing the first end surface of the carbon nanotube array on the first board, fixing the second end surface of the carbon nanotube array on the second board; (c) packaging the first board and the second board to form an apparatus having an entrance; (d) providing a liquid polymer precursor, applying the liquid polymer precursor from the entrance to the apparatus until the liquid polymer precursor submerge carbon nanotube array; and (e) solidifying the liquid polymer precursor.

20 Claims, 2 Drawing Sheets

U.S. PATENT DOCUMENTS

| | | | |
|---|---|---|---|
| 7,438,844 B2* | 10/2008 | Huang et al. | 264/261 |
| 7,538,422 B2* | 5/2009 | Dangelo et al. | 257/706 |
| 7,588,960 B2* | 9/2009 | Bertin et al. | 438/99 |
| 7,641,938 B2* | 1/2010 | Liu et al. | 427/249.1 |
| 7,828,620 B2* | 11/2010 | Gosain et al. | 445/50 |
| 7,871,570 B2* | 1/2011 | Huang et al. | 422/68.1 |
| 7,879,300 B2* | 2/2011 | Mayne et al. | 422/307 |
| 2003/0185741 A1* | 10/2003 | Matyjaszewski et al. | 423/445 R |
| 2004/0101468 A1* | 5/2004 | Liu et al. | 423/447.3 |
| 2006/0073332 A1* | 4/2006 | Huang et al. | 428/367 |
| 2006/0255450 A1* | 11/2006 | Pan et al. | 257/712 |
| 2006/0258054 A1* | 11/2006 | Pan et al. | 438/122 |
| 2007/0114657 A1* | 5/2007 | Dangelo et al. | 257/720 |
| 2007/0114658 A1* | 5/2007 | Dangelo et al. | 257/720 |
| 2007/0116626 A1* | 5/2007 | Pan et al. | 423/447.1 |
| 2007/0116957 A1* | 5/2007 | Pan et al. | 428/408 |
| 2007/0244245 A1* | 10/2007 | Liu et al. | 524/496 |
| 2008/0081176 A1* | 4/2008 | Huang et al. | 428/323 |
| 2008/0087646 A1* | 4/2008 | Liu et al. | 216/96 |
| 2009/0121605 A1* | 5/2009 | Gosain et al. | 313/310 |
| 2009/0155467 A1* | 6/2009 | Wang et al. | 427/294 |
| 2009/0208708 A1* | 8/2009 | Wei et al. | 428/174 |
| 2010/0044230 A1* | 2/2010 | Papadimitrakopoulos et al. | 204/547 |
| 2010/0172101 A1* | 7/2010 | Yao et al. | 361/704 |
| 2011/0024694 A1* | 2/2011 | Shah et al. | 252/502 |
| 2011/0134617 A1* | 6/2011 | Putsch | 361/760 |
| 2011/0180968 A1* | 7/2011 | Hu et al. | 264/328.2 |
| 2011/0182805 A1* | 7/2011 | Desimone et al. | 424/1.11 |

FOREIGN PATENT DOCUMENTS

CN   101054467   10/2007

* cited by examiner providing a carbon nanotube array having a first end surface and a second end surface opposite to the first end surface;

↓ providing a first board and a second board, fixing the first end surface of the carbon nanotube array on the first board, fixing the second end surface of the carbon nanotube array on the second board;

↓ packaging the first board and the second board to form an apparatus having an entrance;

↓ providing a liquid polymer precursor, applying the liquid polymer precursor through the entrance to the carbon nanotube array until the carbon nanotube array is submerged by the liquid polymer precursor; and

↓ solidifying the liquid polymer precursor

FIG. 1

METHOD FOR MAKING COMPOSITE MATERIAL HAVING CARBON NANOTUBE ARRAY

BACKGROUND

1. Technical Field

The disclosure relates to methods for producing composite materials and, particularly, to a method for producing a composite material including a carbon nanotube array.

2. Description of Related Art

Since the report of their discovery in 1991 by Iijima, carbon nanotubes (CNTs) have been extensively studied for their structural, physical chemical, mechanical, electrical, and electromechanical properties. Many potential technological applications have been proposed including using CNTs in hydrogen storage, nanoelectronic devices, field emission displays (FED), field emission microscopy (FEM), chemical sensors, and so on. CNTs are desirable, at least in part, due to their unique electrical and mechanical properties. Currently, the study of carbon nanotube/polymer composite materials is gaining significant attention. Such nanotube-reinforced composite materials have broad applications because of their good antistatic performance, microwave absorbing capability, electromagnetic shielding ability, and so on.

CNT arrays having a plurality of aligned CNTs have excellent mechanical strength and good heat conductivity or heat diffusivity, as such they have been used to produce heat conductive materials and reinforced composite materials. However, during the process of making the composite material having a CNT array, the structure of the CNT array is often destroyed. Thus, the composite material having a CNT array may not achieve the desired effects.

What is needed, therefore, is a method for making a composite material having a CNT array without destroying the original structure of the CNT array.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments.

FIG. 1 is a flow chart of one embodiment of a method for making a composite material having a carbon nanotube array.

Figure 2:
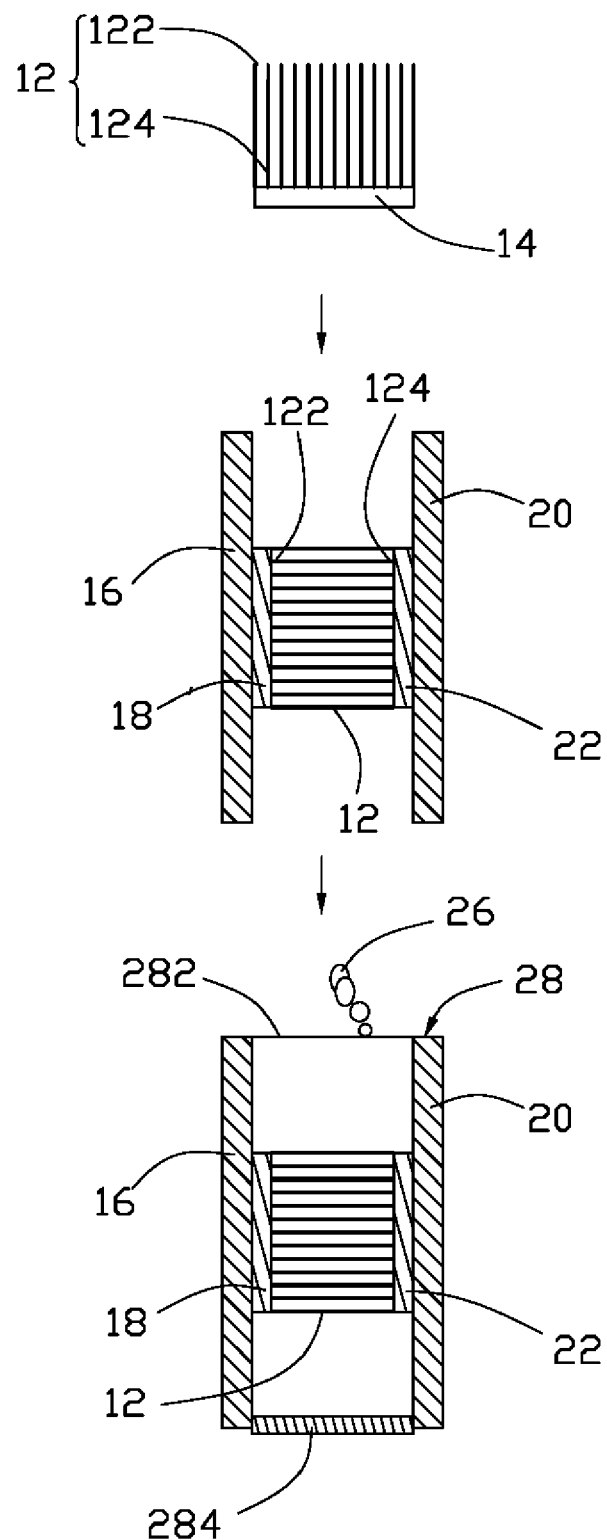
FIG. 2 is a process chart showing the steps of the method of FIG. 1 for making the composite material having the carbon nanotube array.

Corresponding reference characters indicate corresponding parts throughout the several views. The exemplifications set out herein illustrate at least one preferred embodiment of the present method, in one form, and such exemplifications are not to be construed as limiting the scope of the disclosure in any manner.

DETAILED DESCRIPTION

Reference will now be made to the drawings to describe, in detail, embodiments of the method for manufacturing a composite material having a carbon nanotube (CNT) array.

Referring to FIG. 1 and FIG. 2, a method for producing a composite material having a CNT array includes the following steps: (a) providing a CNT array 12 having a first end surface 122 and a second end surface 124 opposite to the first end surface 122; (b) providing a first board 16 and a second board 20, fixing the first end surface 122 of the CNT array 12 on the first board 16, fixing the second end surface 124 of the CNT array 12 on the second board 20; (c) packaging the first board 16 and the second board 20 to form an apparatus 28 with an entrance 282; (d) providing a liquid polymer precursor 26, applying the liquid polymer precursor 26 through the entrance 282 to the CNT array 12 until the CNT array 12 is submerged in the liquid polymer precursor 26; and (e) solidifying the liquid polymer precursor 26.

In step (a), the CNT array 12 can be formed by the steps of: (a1) providing a substrate 14; (a2) forming a catalyst layer on the substrate 14; (a3) annealing the substrate 14 with the catalyst layer; (a4) heating the annealed substrate 14 in a furnace filled with a protective gas; and (a5) supplying a mixture of a protecting gas and a carbon source gas in the furnace, thereby growing the array 12 of the CNTs from the substrate 14 via the catalyst layer.

In step (a), the CNT array 12 includes a plurality of CNTs substantially parallel to each other and approximately perpendicular to the substrate 14. Once the CNT array 12 is formed on the substrate 14, the second end surface 124 of the CNT array 12 is connected to the surface of the substrate 14, and the CNTs in the CNT array 12 extend approximately perpendicularly away from the surface of the substrate 14.

In step (a1), the substrate 14 can be selected from a P-type silicon wafer, a N-type silicon wafer, a wafer of quartz, and glass. In this embodiment, a four-inch P-type silicon wafer is used as the substrate.

In step (a2), the catalyst can be made of iron (Fe), cobalt (Co), nickel (Ni), or any combination alloy thereof. In one embodiment, Fe is selected as the catalyst. A thickness of the Fe catalyst layer is in the approximate range from about 0.5 nanometers (nm) to about 5 nanometers. In the present embodiment the thickness of the Fe catalyst layer is 1 nm. Furthermore, the process for forming the catalyst layer can be by electron beam vapor deposition or magnetron sputtering.

In step (a3), annealing the catalyst layer is done at a temperature of about 700° C. to about 900° C. for about 30 minutes to about 1.5 hours, forming oxide particles on the catalyst layer.

In step (a4), the foregoing substrate in the furnace is heated up to a predetermined temperature in the range of about 600 degrees Celcius (° C.) to about 1000° C. The protective gas can be nitrogen ($N_2$) or a noble gas. Argon (Ar) is selected to act as the protective gas in the present embodiment.

In step (a5), the protecting gas can be $N_2$ or a noble gas. The carbon source gas can be ethylene ($C_2H_4$), methane ($CH_4$), acetylene ($C_2H_2$), ethane ($C_2H_6$), or any combination thereof. In the present embodiment, the protecting gas is hydrogen ($H_2$), and the carbon source gas is acetylene. After the carbon source gas reacts with the catalyst for about 30 minutes to about 1.5 hours, the CNT array 12 is formed on the substrate 14.

It is to be understood that the process of making/growing the CNT array 12 is not limited to the above-described method, other methods for growing the CNT array 12 can also be used. The CNTs in the CNT array 12 can be selected from the group consisting of single-walled, double-walled, and multi-walled CNTs.

In step (b), the first board 16 and the second board 20 sandwich the CNT array. A shape of the first board 16 and the second board 20 is not limited, it can be square, round, triangular, and so on. A material of the first board 16 and the second board 20 is not limited, and can be selected from a group consisting of glass, metal, silicon dioxide, or combination thereof. The CNT array 12 can keep its original structure when making the composite material having CNT array, because the CNT array 12 is fixed on the first board 16 and the second board 20.

In step (b), the method for fixing the CNT array 12 includes the following substeps: (b1) coating a first adhesive layer 18 on the first board 16, and coating a second adhesive layer 22 on the second board 20; (b2) attaching the first end surface 122 of the CNT array 12 to the first board 16 via the first adhesive layer 18, attaching the second end surface 124 of the CNT array 12 to the second board 20 via the second adhesive layer 22; and (b3) baking the first adhesive layer 18 and the second adhesive layer 22.

In step (b2), the material of the first adhesive layer 18 or the second adhesive layer 22 can be selected from a group consisting of rubber, polyurethane glue, and silicon glue. A thickness of the first adhesive layer 18 or the second adhesive layer 22 can be in a range from about 0.1 micrometers (μm) to about 10 μm.

In step (b2), in this embodiment, because the CNT array 12 is formed in the substrate 14, before attaching the second end surface 124 of the CNT array 12 to the second board 20, a step of stripping the CNT array 12 from the substrate 14 can be alternatively included. The CNT array 12 can be stripped from the substrate 14 by mechanical planarization or chemical corrosion. In one embodiment, the CNT array 12 is stripped from the substrate 14 by the following steps: (b21) fixing the substrate 14 on which the CNT array 12 is formed; and (b22) providing a metal sheet (not shown) to insert into an interface between the substrate 14 and the second end surface 124 of the CNT array 12 to separate the CNT array 12 from the substrate 14. A thickness of the metal sheet can range from about 5 μm to about 15 μm. After removing the substrate 14, the second end surface 124 of the CNT array 12 can be directly attached to the second adhesive layer 22. Alternatively, if the CNT array 12 is not stripped from the substrate 14, the second end surface 124 of the CNT array 12 remains fixed on the substrate 14, and the substrate 14 is attached to the second board 20.

In step (b3), a temperature of baking the first adhesive layer 18 and the second adhesive layer 22 is decided according to the curing temperature of the selected adhesive. A range of the temperature is about 20° C. to about 150° C. In the present embodiment, the material of the first adhesive layer 18 and the second adhesive layer 22 is silicon glue, and the curing temperature is about 100° C.

In step (c), at least one lateral board 284 will be provided with the first board 16 and the second board 18 to cooperatively form an apparatus 28. In the present embodiment, the first board 16 and the second board 18 can be packaged with the at least one lateral board 284 to form a cuboid apparatus 28 having an entrance 282. The first board 16 and the second board 20 are two side walls of the cubiod apparatus 28, and the CNT array 12 is located in the cubiod apparatus 28. The first board 16, the second board 18 and the at least one lateral board 284 may be packaged together by silica gel.

In step (d), liquid polymer precursor 26 can be a liquid with low viscosity, the viscosity of the liquid polymer precursor being less than 1 Pa·s. The liquid polymer precursor 26 can be a polymer in liquid state. The polymer can be a thermosetting material or a thermoplastic material. The thermosetting material can be selected from a group consisting of epoxy resin, bismaleimide resin, cyanate ester resin, and silicone rubber. The thermoplastic material can be selected from a group consisting of polypropylene, polyethylene, polyvinyl alcohol, and polymethacrylate resin. The liquid polymer precursor 26 can also be a low viscosity polymer liquid formed by dissolving the epoxy resin in ethyl acetate.

In step (d), the liquid polymer precursor 26 can be dropped or injected into the apparatus 28 to infuse the CNT array 12. In some embodiments, the liquid polymer precursor 26 can be dropped or injected into the apparatus 28 along a direction that is perpendicular to an axial direction of the CNT array 12. The liquid polymer precursor 26 should be dropped into the apparatus 28 so as not to damage the CNT array 12. In the process described above, in order to keep the liquid polymer precursor 26 in a liquid state, the surrounding temperature can be kept in a range from about 20° C. to about 80° C.

In step (e), the process of solidifying the above-described liquid polymer precursor 26 includes the following steps: (e1): put the CNT array 12 submerged in the liquid polymer precursor in an oven; (e2): heating the CNT array 12 submerged in the liquid polymer precursor at a temperature ranging from about 80° C. to about 100° C. for about 1 hour to 30 hours; (e3): heating the CNT array 12 submerged in the liquid polymer precursor at a temperature ranging from about 120° C. to about 300° C. for about 3 hours to 20 hours. After the solidifying process, the composite material having the CNT array 12 is formed. Specifically, the CNT array 12 with polymer precursor can be solidified in a vacuum chamber. The pressure of the vacuum chamber can be in a range from about $10^{-4}$ Pa to about $10^{-6}$ Pa.

Alternatively, before step (e), a step of vacuuming the apparatus 28 can be provided. The apparatus 28 can be vacuumed directly from the entrance 282 therein. The apparatus 28 can alternatively be disposed in a closed space, and the closed space vacuumed. Vacuuming is stopped when the pressure in the apparatus 28 reaches a pressure ranging from about $10^{-4}$ Pa to about $10^{-6}$ Pa. Vacuuming the apparatus 28 removes any air pockets that may exist in the CNT array 12 submerged in the liquid polymer precursor 26. The pressure of the apparatus 28 should be maintained for more than 10 minutes to make sure that the air pockets are removed completely. During the process of vacuuming the apparatus 28, the wettability between the CNT array 12 and the liquid polymer precursor 26 is improved.

Alternatively, after step (e), a step of slicing the composite material having the CNT array 12 to expose the CNT array 12 may be performed. The composite material having CNT array 12 can be sliced along a direction approximately perpendicular to the axis of the CNTs in the CNT array 12 by a slicer.

It is to be understood that the above-described embodiments are intended to illustrate rather than limit the invention. Variations may be made to the embodiments without departing from the spirit of the invention as claimed. The above-described embodiments illustrate the scope of the invention but do not restrict the scope of the invention.

It is also to be understood that above description and the claims drawn to a method may include some indication in reference to certain steps. However, the indication used is only to be viewed for identification purposes and not as a suggestion as to an order for the steps.

What is claimed is:

1. A method for producing a composite material having a carbon nanotube array, the method comprising:
    providing the carbon nanotube array having a first end surface and a second end surface opposite to the first end surface;
    providing a first board and a second board, and fixing the first end surface of the carbon nanotube array on the first board and the second end surface of the carbon nanotube array on the second board;
    packaging the first board and the second board to form an apparatus having an entrance;

applying a liquid polymer precursor through the entrance into the apparatus until the carbon nanotube array is submerged by the liquid polymer precursor; and solidifying the liquid polymer precursor to obtain the composite material.

2. The method as claimed in claim 1, wherein the method for fixing the carbon nanotube array comprises:

coating a first adhesive layer on the first board, and coating a second adhesive layer on the second board;

attaching the first end surface of the carbon nanotube array to the first board via the first adhesive layer and the second end surface of the carbon nanotube array to the second board via the second adhesive layer;

baking the first adhesive layer and the second adhesive layer to fix the carbon nanotube array between the first board and second board.

3. The method as claimed in claim 2, wherein a thickness of the first adhesive layer or the second adhesive layer ranges from about 0.1 µm to about 10 µm.

4. The method as claimed in claim 1, wherein the carbon nanotube array is grown on a substrate, and the second end surface of the carbon nanotube array is contacting the substrate.

5. The method as claimed in claim 4, wherein the second end surface of the carbon nanotube array is attached to the second board via the substrate.

6. The method as claimed in claim 4, further comprising a step of stripping the carbon nanotube array from the substrate, before fixing the second end surface of the carbon nanotube array on the second board.

7. The method as claimed in claim 6, wherein the carbon nanotube array is stripped from the substrate by mechanical planarization or chemical corrosion.

8. The method as claimed in claim 6, wherein the method of stripping the carbon nanotube array from the substrate, comprises:

fixing the substrate on which the carbon nanotube array is formed; and providing a metal sheet to insert into an interface between the substrate and the second end surface of the carbon nanotube array to separate the carbon nanotube array from the substrate.

9. The method as claimed in claim 1, wherein the step of packaging the first board and the second board comprises providing at least one lateral board to cooperate with the first board and the second board to form a cubical apparatus.

10. The method as claimed in claim 1, wherein the liquid polymer precursor is dropped or injected into the apparatus to infuse the carbon nanotube array.

11. The method as claimed in claim 10, wherein the liquid polymer precursor is dropped or injected into the apparatus along a direction approximately perpendicular to an axial direction of the carbon nanotube array.

12. The method as claimed in claim 1, wherein the liquid polymer precursor is a liquid with a viscosity of less than 1 Pa·s.

13. The method as claimed in claim 1, wherein the liquid polymer precursor is solidified in a vacuum chamber.

14. The method as claimed in claim 1, wherein the step of solidifying the liquid polymer precursor comprises the following steps:

putting the carbon nanotube array submerged by the liquid polymer precursor into an oven; heating the carbon nanotube array submerged by the liquid polymer precursor at a temperature ranging from about 80° C. to about 100° C. for about 1 hour to about 30 hours; and heating the carbon nanotube array with the liquid polymer precursor at a temperature ranging from about 120° C. to about 300° C. for about 3 hours to about 20 hours.

15. The method as claimed in claim 1, further comprising a step of removing the air from the carbon nanotube array submerged by the liquid polymer precursor by vacuuming the apparatus before the step of solidifying the liquid polymer precursor.

16. The method as claimed in claim 1, further comprising a step of slicing the composite material to expose the carbon nanotube array, after the step of solidifying the liquid polymer precursor.

17. The method as claimed in claim 16, the composite material is sliced along a direction approximately perpendicular to the axis of the carbon nanotubes in the carbon nanotube array by a slicer.

18. A method for producing a composite material comprising a carbon nanotube array, the method comprising:

providing a carbon nanotube array having a first end surface and a second end surface opposite to the first surface;

providing a first board and a second board, fixing the first end surface of the carbon nanotube array on the first board, and fixing the second end surface of the carbon nanotube array on the second board;

packaging the first board and the second board to form a cubical apparatus having an entrance;

applying a liquid polymer precursor through the entrance into the apparatus until the carbon nanotube array is submerged by the liquid polymer precursor;

vacuuming the apparatus; and solidifying the liquid polymer precursor.

19. The method as claimed in claim 18, wherein a pressure in the apparatus after vacuuming the apparatus is in a range from about $10^{-4}$ Pa to about $10^{-6}$ Pa.

20. The method as claimed in claim 18, wherein the step of solidifying the liquid polymer precursor comprises the following steps:

putting the carbon nanotube array submerged by the liquid polymer precursor into an oven;

heating the carbon nanotube array submerged by the liquid polymer precursor at a temperature ranging from about 80° C. to about 100° C. for about 1 hour to about 30 hours; and heating the carbon nanotube array with the liquid polymer precursor at a temperature ranging from about 120° C. to about 300° C. for about 3 hours to about 20 hours.

* * * * *